US012633711B1

(12) United States Patent
Hu

(10) Patent No.: US 12,633,711 B1
(45) Date of Patent: May 19, 2026

(54) ROTATABLE PLUG

(71) Applicant: Junrong Hu, Zhongshan (CN)

(72) Inventor: Junrong Hu, Zhongshan (CN)

(*) Notice: Subject to any disclaimer, the term of this patent is extended or adjusted under 35 U.S.C. 154(b) by 0 days.

(21) Appl. No.: 19/433,685

(22) Filed: Dec. 26, 2025

(30) Foreign Application Priority Data

Dec. 5, 2025 (CN) ......................... 202522590521.3

(51) Int. Cl.
*H01R 39/64* (2006.01)

(52) U.S. Cl.
CPC .................................. *H01R 39/64* (2013.01)

(58) Field of Classification Search
CPC ........ H01R 35/04; H01R 13/04; H01R 35/00; H01R 13/10; H01R 24/30; H01R 13/652; H01R 39/64
USPC ............................................................ 439/18
See application file for complete search history.

(56) References Cited

U.S. PATENT DOCUMENTS 5,399,093 A * 3/1995 Schneider .............. H01R 24/28 439/21
5,997,310 A * 12/1999 Chiu ...................... H01R 24/30 439/11
6,793,499 B1 * 9/2004 Chen ...................... H01R 39/64 439/21
7,238,028 B2 * 7/2007 Gerard ................... H01R 31/02 439/954
7,255,568 B1 * 8/2007 Wu ........................ H01R 39/64 439/23
7,500,854 B2 * 3/2009 Gottstein ............. H01R 25/006 439/21
7,566,223 B2 * 7/2009 Wadsworth ............ H01R 39/64 439/21
2010/0285687 A1 * 11/2010 Wadsworth ............ H01R 35/02 439/660
2014/0213072 A1 * 7/2014 Cheng .................... H01R 39/64 439/18

FOREIGN PATENT DOCUMENTS

CN 2301002 Y * 12/1998
CN 2519498 Y * 10/2002

* cited by examiner

*Primary Examiner* — Tulsidas C Patel
*Assistant Examiner* — Jeffrey Mountain
(74) *Attorney, Agent, or Firm* — Birchwood IP

(57) ABSTRACT

Provided is a rotatable plug, which includes a plug connection socket, a conductive component, a pin component, an electrical connection component, a compression seat, and a rotation limit structure. The structure of this application is simple. Through a rotation setting between the conductive component and the pin component, as well as the connection and coordination with the electrical connection component, the pin component can rotate 360 degrees according to requirements. It is convenient to use, has a simple structure, stable conductivity, and is not easy to damage a power cord; at the same time, by providing the rotation limit structure, a relative positional relationship between the pin component and the conductive component can be limited after the pin component is selected and adjusted in place, ensuring connection stability and avoiding arbitrary rotation during use, greatly improving the stability of use.

8 Claims, 5 Drawing Sheets

ROTATABLE PLUG

CROSS-REFERENCE TO RELATED APPLICATIONS

This application claims priority to Chinese Patent Application No. 202522590521.3, filed on Dec. 5, 2025, which is hereby incorporated by reference in its entirety.

TECHNICAL FIELD

The present disclosure relates to the field of plug technologies, and in particular, to a rotatable plug.

BACKGROUND

Existing electrical equipment usually comes with a power plug, where the plug and power cord are in a fixed connection relationship. Moreover, due to the directional nature of the sockets, when the space between the plug and the socket fixed on the wall or floor is small, the power cord is prone to twisting relative to the plug, rendering it inconvenient for the plug to be inserted into the socket. Especially for electrical equipment that requires a change in position during use, such as a vacuum cleaner, a hair dryer, a power tool, etc., traditional plugs can cause the wires near the plug connection to repeatedly undergo twisting in different directions, resulting in damage or breakage of the power cord at the plug connection, posing a safety hazard to the electrical equipment. Besides that, there are currently power plugs that can be rotated, but their structures are usually complex and costly. Moreover, the plugs can only rotate a certain angle and cannot achieve 360 degree rotation, or there is a lack of corresponding limit structures between the rotating structures, resulting in the plug being unable to achieve the corresponding limit after rotation adjustment. During use, there may be situations of arbitrary rotation, which is quite troublesome.

SUMMARY

In order to overcome the shortcomings of existing technology, the present disclosure provides a rotatable plug.

The technical solution adopted by the present disclosure to solve its technical problem is as follows.

A rotatable plug, including:

- a plug connection socket, which is provided with an assembly cavity;
- a conductive component, which is provided in the assembly cavity and electrically connected to the plug connection socket;
- a pin component, which is movably provided within the assembly cavity and is configured to rotate relative to the conductive component to adjust a relative positional relationship between the two;
- an electrical connection component, which is provided between the conductive component and the pin component to establish an electrical connection between the two components;
- a compression seat, which is provided on the plug connection socket to limit the conductive component, the pin component, and the electrical connection component within the assembly cavity;
- a rotation limit structure, which is provided between the pin component and the compression seat, and the rotation limit structure is configured to limit a relative positional relationship between the pin component and the conductive component when the pin component is rotated and adjusted in place.

In some embodiments of the present disclosure, the rotation limit structure includes a rotating pressure piece provided on the pin component, limit protrusions protruding on one side of the rotating pressure piece, and a plurality of limit ribs arranged and protruding on an inner wall of the compression seat, and a limit groove is provided between adjacent two limit ribs, where the limit protrusions are embedded in a corresponding limit groove to limit a relative position of the rotating pressure piece, thereby limiting a relative positional relationship between the pin component and the conductive component.

In some embodiments of the present disclosure, the conductive component includes a fixed seat, and a first conductive copper ring, a second conductive copper ring, and a conductive copper sheet provided on the fixed seat, where the first conductive copper ring and the second conductive copper ring are respectively provided with conductive connection parts, and the two conductive connection parts respectively pass through the fixed seat and are electrically connected to the plug connection socket, one end of the conductive copper sheet passes through the fixed seat and is electrically connected to the plug connection socket, and the pin component is electrically connected to the first conductive copper ring, the second conductive copper ring, and the conductive copper sheet through the electrical connection component.

In some embodiments of the present disclosure, the pin component includes a pin mounting seat, and first pins, second pins, and third pins respectively inserted into the pin mounting seat, where the first pins, second pins, and third pins are respectively electrically connected to the first conductive copper ring, second conductive copper ring, and conductive copper sheet through the electrical connection component.

In some embodiments of the present disclosure, the electrical connection component includes a first electrical connection copper sheet, a second electrical connection copper sheet, and a third electrical connection copper sheet, where two ends of the first electrical connection copper sheet are respectively electrically connected to the first pins and the first conductive copper ring, two ends of the second electrical connection copper sheet are respectively electrically connected to the second pins and the second conductive copper ring, and two ends of the third electrical connection copper sheet are respectively electrically connected to the third pins and the conductive copper sheet.

In some embodiments of the present disclosure, the first electrical connection copper sheet is further provided with a first plug-in part that is configured to be inserted into the pin mounting seat and electrically connected to the first pins, and the second electrical connection copper sheet is further provided with a second plug-in part that is configured to be inserted into the pin mounting seat and electrically connected to the second pins.

In some embodiments of the present disclosure, the first electrical connection copper sheet and the second electrical connection copper sheet are respectively provided with a plurality of conductive protrusions, and the first electrical connection copper sheet and the second electrical connection copper sheet are respectively electrically connected to the first conductive copper ring and the second conductive copper ring through the conductive protrusions.

In some embodiments of the present disclosure, the fixed seat is further provided with a first ring groove and a second ring groove, the first conductive copper ring is provided in the first ring groove, the first electrical connection copper sheet is inserted into the first ring groove, the second conductive copper ring is provided in the second ring groove, and the second electrical connection copper sheet is inserted into the second conductive copper ring.

In some embodiments of the present disclosure, the third electrical connection copper sheet is further provided with an electrical connection protrusion, and the conductive copper sheet is further provided with a conductive protrusion plate that is configured to cooperate with the electrical connection protrusion for conduction.

The beneficial effects of the present disclosure are: the structure of this application is simple, and through the rotation setting between the conductive component and the pin component, as well as the connection and cooperation with the electrical connection component, the pin component can rotate 360 degrees according to requirements, which is convenient to use, simple in structure, stable in conductivity, and not easy to damage a power cord. At the same time, by providing the rotation limit structure, a relative positional relationship between the pin component and the conductive component can be limited after the pin component is selected and adjusted in place, ensuring connection stability and avoiding arbitrary rotation during use, greatly improving the stability of use.

BRIEF DESCRIPTION OF DRAWINGS

In order to provide a clearer explanation of the technical solution in the embodiments of the present application, a brief introduction will be given to the drawings required for the description of the embodiments. It is obvious that the drawings described below are only some embodiments of the present application. For those skilled in the art, other drawings can be obtained based on these drawings without creative work.

DESCRIPTION OF EMBODIMENTS

The technical solution of the present disclosure will be described in detail below with reference to the accompanying drawings and embodiments.

Figure 1:
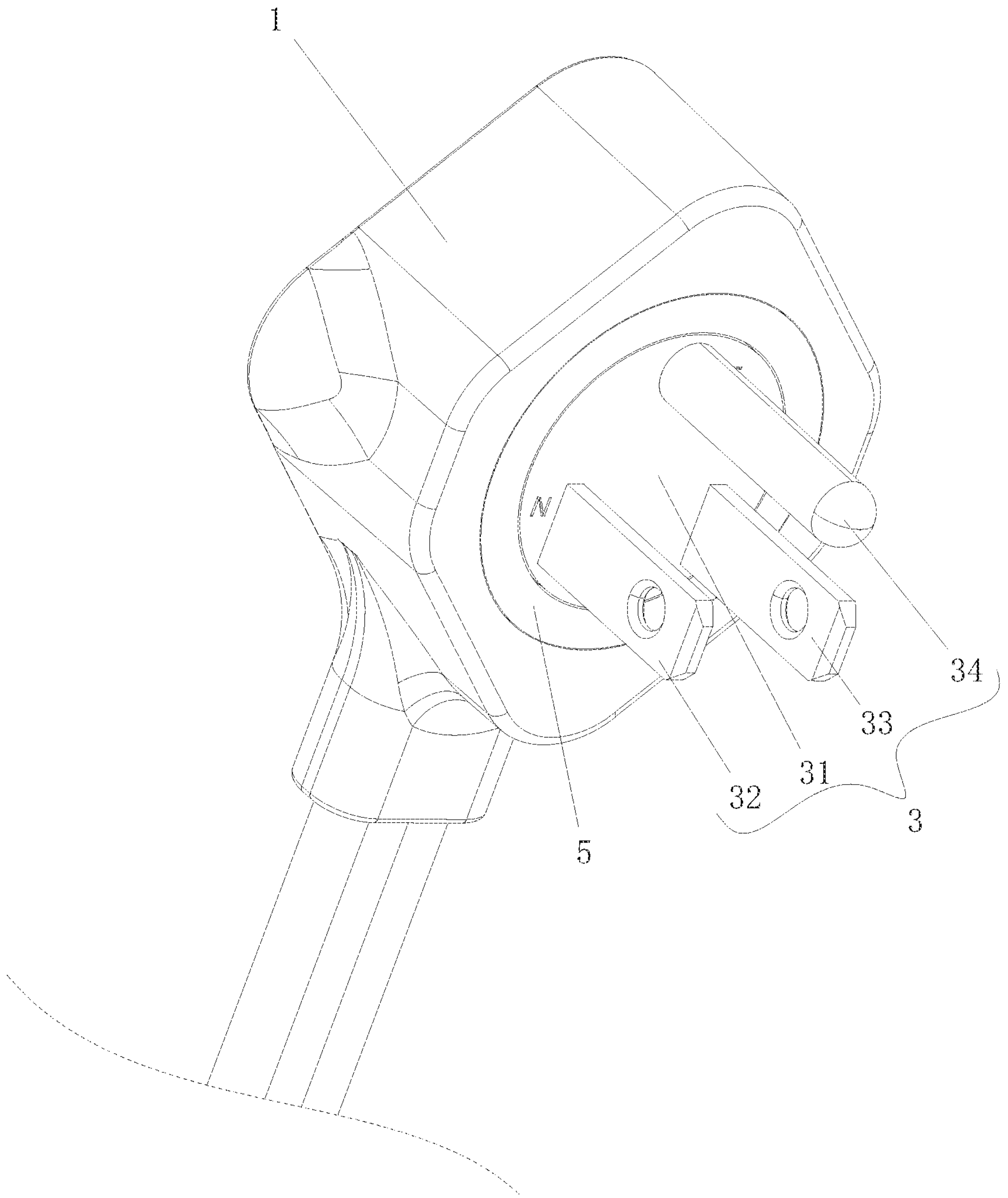
FIG. 1 is a schematic structural diagram of a rotatable plug according to an embodiment of the present disclosure.
Figure 2:
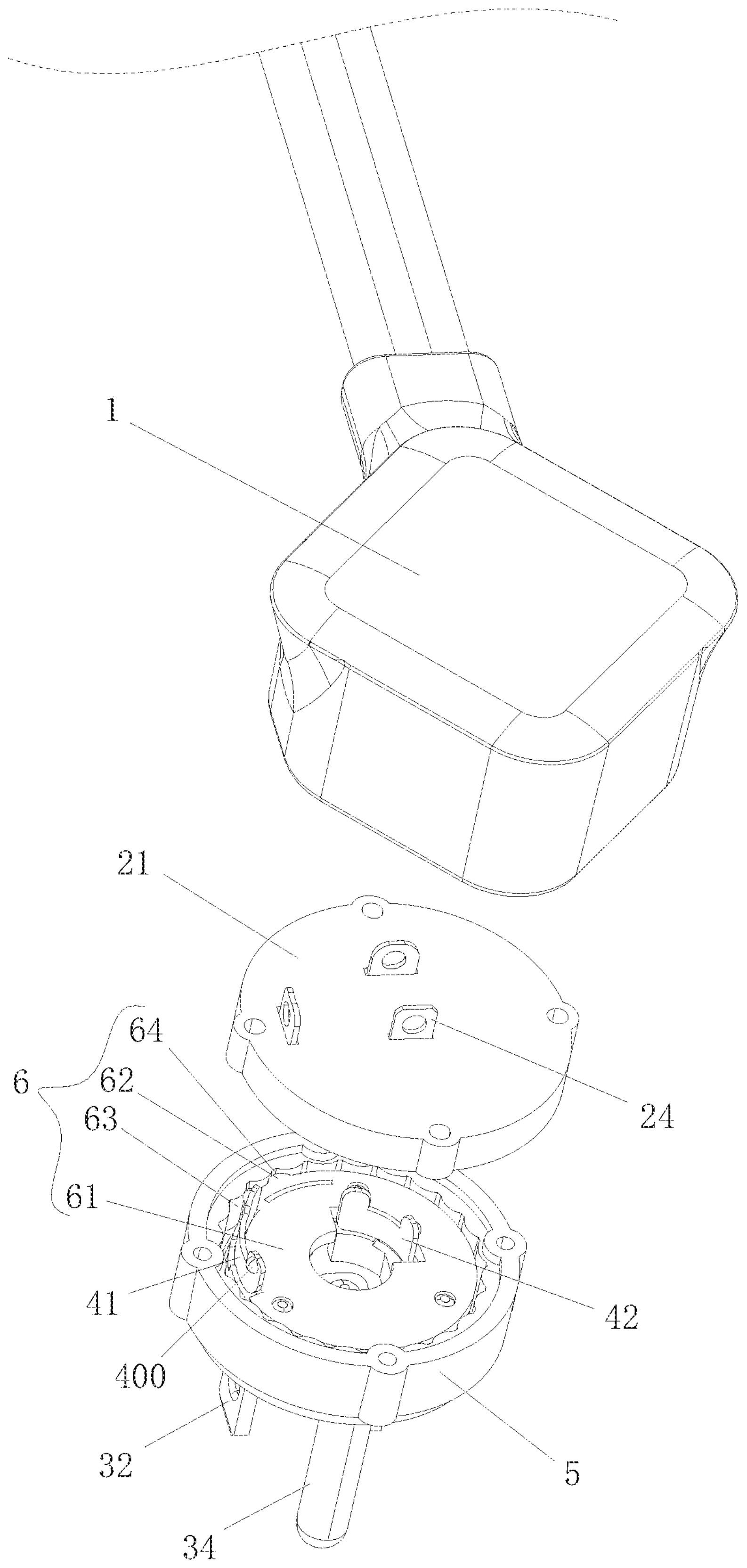
FIG. 2 is a first exploded structural view of the rotatable plug according to an embodiment of the present disclosure.
Figure 3:
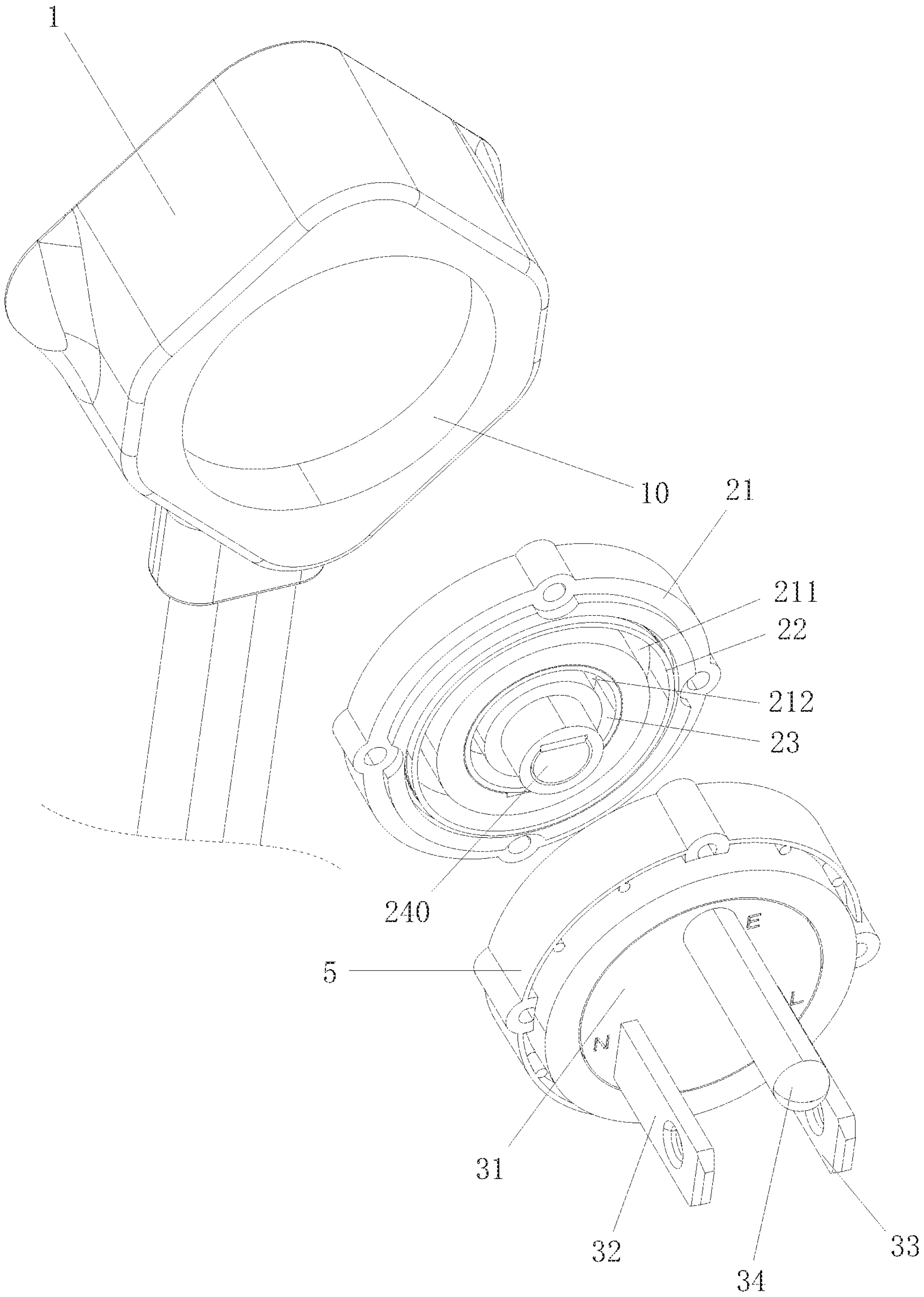
FIG. 3 is a second exploded structural view of the rotatable plug according to an embodiment of the present disclosure.
Figure 4:
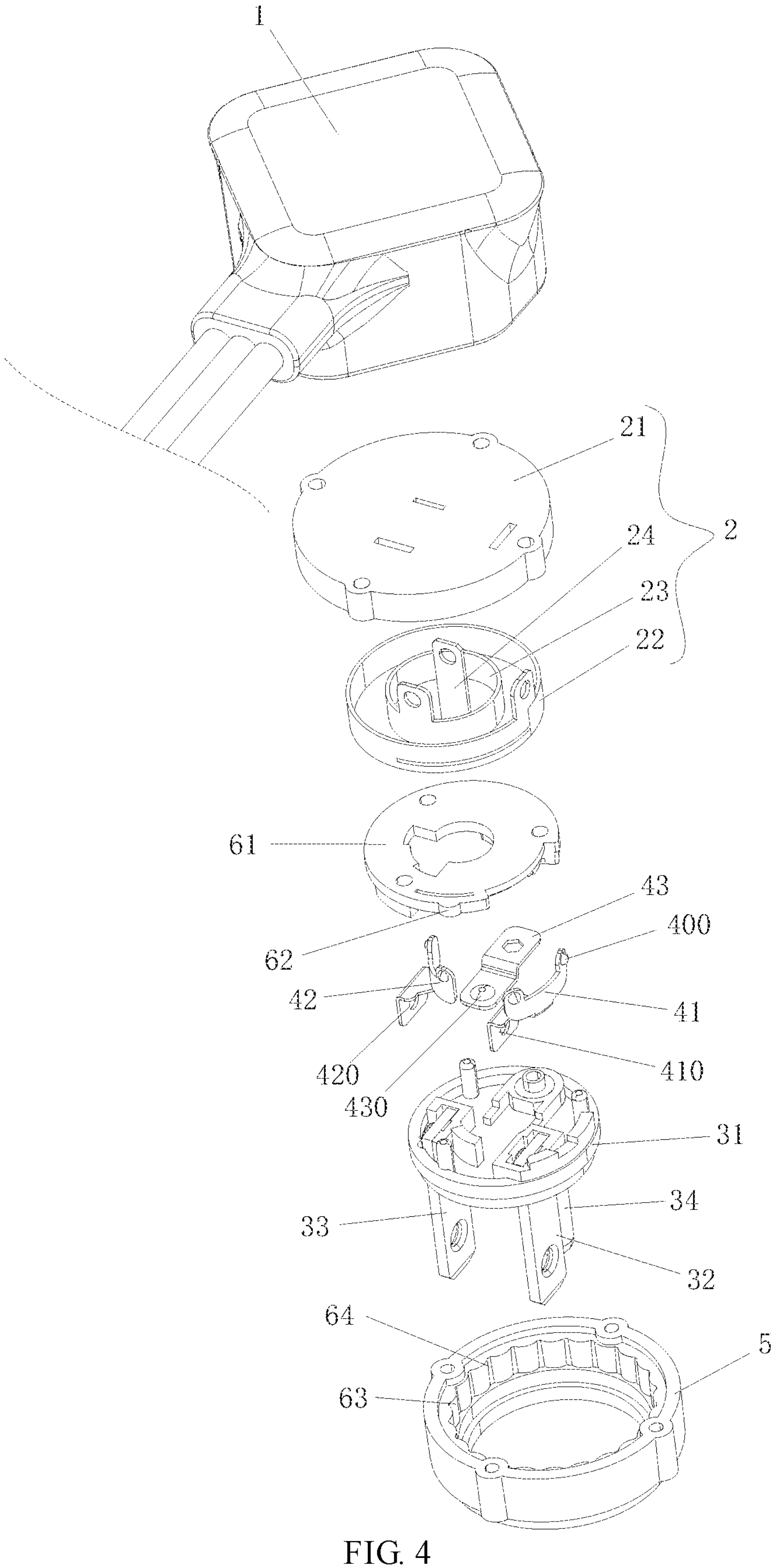
FIG. 4 is a third exploded structural view of the rotatable plug according to an embodiment of the present disclosure.
Figure 5:
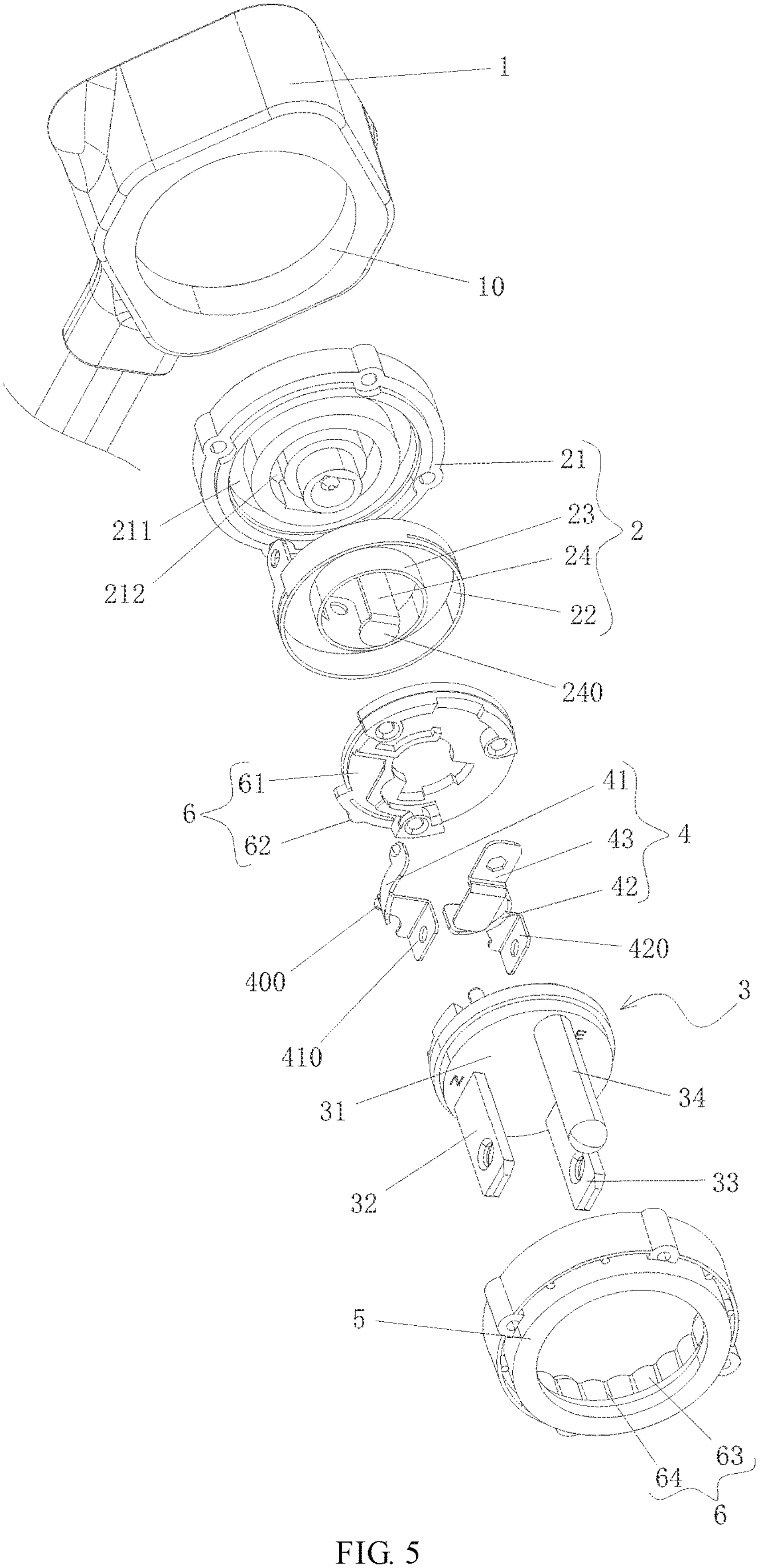
FIG. 5 is a fourth exploded structural view of the rotatable plug according to an embodiment of the present disclosure.

Please refer to FIGS. 1 to 5. An embodiment of the present disclosure provides a rotatable plug, including:

- a plug connection socket 1, with an assembly cavity 10 provided on it;
- a conductive component 2, provided inside the assembly cavity 10 and electrically connected to the plug connection socket 1;
- a pin component 3, movably provided within the assembly cavity 10 and is configured to rotate relative to the conductive component 2 to adjust a relative position between the two;
- an electrical connection component 4 provided between the conductive component 2 and the pin component 3, configured to establish an electrical connection between the two components;
- a compression seat 5 provided on the plug connection socket 1 and configured to limit the conductive component 2, pin component 3, and electrical connection component 4 within the assembly cavity;
- a rotation limit structure 6, which is provided between the pin component 3 and the compression seat 5, and is configured to limit a relative positional relationship between the pin component 3 and the conductive component 2 when the pin component 3 is rotated and adjusted in place.

By rotating the conductive component 2 and the pin component 3, as well as connecting and cooperating with the electrical connection component 4, the pin component 3 can rotate 360 degrees according to requirements, rendering it easy to use, simple in structure, stable in conductivity, and less likely to damage a power cord. At the same time, by providing the rotation limit structure 6, a relative positional relationship between the pin component 3 and the conductive component 2 can be limited after the pin component 3 is selected and adjusted in place, thereby ensuring connection stability and avoiding arbitrary rotation during use, greatly improving the stability of use.

In an implementation mode, the rotation limit structure 6 includes a rotating pressure piece 61 provided on the pin component 3, limit protrusions 62 protruding from one side of the rotating pressure piece 61, and a plurality of limit ribs 63 arranged and protruding from an inner wall of the compression seat 5. A limit groove 64 is provided between adjacent limit ribs 63, and the limit protrusions 62 are embedded in the corresponding limit groove 64 to limit a relative position of the rotating pressure piece 61, thereby limiting a relative positional relationship between the pin component 3 and the conductive component 2.

By coordinating the limit protrusions 62 with the limit groove 64, it is convenient to limit the rotating pressure piece 61, thereby restricting the relative positional relationship between the pin component 3 and the conductive component 2, which is practical and convenient.

In an implementation mode, the conductive component 2 includes a fixed seat 21, and a first conductive copper ring 22, a second conductive copper ring 23, and a conductive copper sheet 24 provided on the fixed seat. The first conductive copper ring 22 and the second conductive copper ring 23 are respectively provided with conductive connection parts 25. The two conductive connection parts 25 pass through the fixed seat 21 and are electrically connected to the plug connection socket 1. One end of the conductive copper sheet 24 passes through the fixed seat 21 and is electrically connected to the plug connection socket 1. The pin component 3 is electrically connected to the first conductive copper ring 22, the second conductive copper ring 23, and the conductive copper sheet 24 through the electrical connection component 4.

The pin component 3 includes a pin mounting seat 31, and first, second, and third pins 32, 33, and 34 respectively inserted into the pin mounting seat 31. The first, second, and third pins 32, 33, and 34 are respectively electrically connected to the first conductive copper ring 22, the second conductive copper ring 23, and the conductive copper sheet 24 through the electrical connection component 4.

The electrical connection component includes a first electrical connection copper sheet 41, a second electrical connection copper sheet 42, and a third electrical connection copper sheet 43. Two ends of the first electrical connection copper sheet 41 are respectively electrically connected to the first pins 32 and the first conductive copper ring 22. Two ends of the second electrical connection copper sheet 42 are respectively electrically connected to the second pins 33 and the second conductive copper ring 23. Two ends of the third electrical connection copper sheet 43 are respectively electrically connected to the third pins 34 and the conductive copper sheet 24.

By coordinating the first conductive copper ring 22 with the first electrical connection copper sheet 41, the second conductive copper ring 23 with the second electrical connection copper sheet 42, and the conductive copper sheet 24 with the third electrical connection copper sheet 43, the pin component 3 maintains the electrical connection between the first pins 32, the second pins 33, and the third pins 34 and the conductive component 2 before and after rotation adjustment. The structure is simple, the conductivity is stable, and the power cord is not easily damaged.

In an implementation mode, the first electrical connection copper sheet 41 is further provided with a first plug-in part 410 that can be inserted into the pin mounting seat 31 and electrically connected to the first pins 32, and the second electrical connection copper sheet 42 is further provided with a second plug-in part 420 that can be inserted into the pin mounting seat 31 and electrically connected to the second pins 33.

By providing the first and second plug-in parts 410 and 420, as well as the plug-in settings between the first and second plug-in parts 410 and 420 and the pin mounting seat 31, not only can the first electrical connection copper sheet 41 and the second electrical connection copper sheet 42 be fixedly provided on the pin mounting seat 31, but also the electrical connection relationship between the first electrical connection copper sheet 41 and the first pins 32, and between the second electrical connection copper sheet 42 and the second pins 33 can be maintained.

In an implementation mode, the third electrical connection copper sheet 43 is further provided with an electrical connection protrusion 430, and the conductive copper sheet 24 is further provided with a conductive protrusion plate 240 that can cooperate with the electrical connection protrusion 430 for conduction.

In this embodiment, the third electrical connection copper sheet 43 is directly installed into the pin mounting seat 31, with one end sleeved on an upper end of the third pins 34 and the other end provided with an electrical connection protrusion 430. Through the cooperation of the electrical connection protrusion 430 and the conductive protrusion plate 240, the electrical connection relationship between the first electrical connection copper sheet 41 and the first pins 32, and between the second electrical connection copper sheet 42 and the second pins 33 is maintained, which is practical and convenient.

In an implementation mode, the first electrical connection copper sheet 41 and the second electrical connection copper sheet 42 are respectively provided with a plurality of conductive protrusions 400. The first electrical connection copper sheet 41 and the second electrical connection copper sheet 42 are respectively electrically connected to the first conductive copper ring 22 and the second conductive copper ring 23 through the conductive protrusions 400.

The fixed seat 21 is further provided with a first ring groove 211 and a second ring groove 212. The first conductive copper ring 22 is provided in the first ring groove 211, the first electrical connection copper sheet 41 is inserted into the first ring groove 211, the second conductive copper ring 23 is provided in the second ring groove 212, and the second electrical connection copper sheet 42 is inserted into the second conductive copper ring 23.

By providing the first ring groove 211 and the second ring groove 212, the pin component 3 can slide the first electrical connection copper sheet 41 and the second electrical connection copper sheet 42 in the first ring groove 211 and the second ring groove 212 respectively during a rotation adjustment process, and maintain the electrical connection relationship with the first conductive copper ring 22 and the second conductive copper ring 23 through the conductive protrusions 400. It is easy to use, has a simple structure, stable conductivity, and it is not easy to damage the power cord.

In summary, the embodiments of the present application enable the pin component 3 to rotate 360 degrees according to requirements through the rotational setting between the conductive component 2 and the pin component 3, as well as the connected cooperation with the electrical connection component 4. This makes it easy to use, has a simple structure, stable conductivity, and is less likely to damage the power cord. At the same time, by providing the rotation limit structure 6, the relative positional relationship between the pin component 3 and the conductive component 2 can be limited after the pin component is selected and adjusted in place, thereby ensuring connection stability and avoiding arbitrary rotation during use, greatly improving the stability of use.

The above description is only embodiments of the present disclosure and does not limit the scope of the present disclosure. Any equivalent structure made using the specification and drawings of the present disclosure, or directly or indirectly applied in other related technical fields, is also included in the protection scope of the present disclosure.

What is claimed is:

1. A rotatable plug, comprising:

a plug connection socket, which is provided with an assembly cavity;

a conductive component, which is provided in the assembly cavity and electrically connected to the plug connection socket;

a pin component, which is movably provided within the assembly cavity and is configured to rotate relative to the conductive component to adjust a relative positional relationship between the two;

an electrical connection component, which is provided between the conductive component and the pin component to establish an electrical connection between the two components;

a compression seat, which is provided on the plug connection socket to limit the conductive component, the pin component, and the electrical connection component within the assembly cavity;

a rotation limit structure, which is provided between the pin component and the compression seat, and the rotation limit structure is configured to limit a relative positional relationship between the pin component and the conductive component when the pin component is rotated and adjusted in place;

wherein the conductive component comprises a fixed seat, and a first conductive copper ring, a second conductive copper ring, and a conductive copper sheet provided on the fixed seat, wherein the first conductive copper ring and the second conductive copper ring are respectively provided with conductive connection parts, and two conductive connection parts respectively pass through the fixed seat and are electrically connected to the plug connection socket, one end of the conductive copper sheet passes through the fixed seat and is electrically connected to the plug connection socket, and the pin component is electrically connected to the first conductive copper ring, the second conductive copper ring, and the conductive copper sheet through the electrical connection component.

2. The rotatable plug according to claim 1, wherein the rotation limit structure comprises a rotating pressure piece provided on the pin component, limit protrusions protruding on one side of the rotating pressure piece, and a plurality of limit ribs arranged and protruding on an inner wall of the compression seat, and a limit groove is provided between two adjacent limit ribs, wherein the limit protrusions are embedded in a corresponding limit groove to limit a relative position of the rotating pressure piece, thereby limiting a relative positional relationship between the pin component and the conductive component.

3. The rotatable plug according to claim 1, wherein the pin component comprises a pin mounting seat, and first pins, second pins, and third pins respectively inserted into the pin mounting seat, wherein the first pins, second pins, and third pins are respectively electrically connected to the first conductive copper ring, second conductive copper ring, and conductive copper sheet through the electrical connection component.

4. The rotatable plug according to claim 3, wherein the electrical connection component comprises a first electrical connection copper sheet, a second electrical connection copper sheet, and a third electrical connection copper sheet, wherein two ends of the first electrical connection copper sheet are respectively electrically connected to the first pins and the first conductive copper ring, two ends of the second electrical connection copper sheet are respectively electrically connected to the second pins and the second conductive copper ring, and two ends of the third electrical connection copper sheet are respectively electrically connected to the third pins and the conductive copper sheet.

5. The rotatable plug according to claim 4, wherein the first electrical connection copper sheet is further provided with a first plug-in part that is configured to be inserted into the pin mounting seat and electrically connected to the first pins, and the second electrical connection copper sheet is further provided with a second plug-in part that is configured to be inserted into the pin mounting seat and electrically connected to the second pins.

6. The rotatable plug according to claim 4, wherein the first electrical connection copper sheet and the second electrical connection copper sheet are respectively provided with a plurality of conductive protrusions, and the first electrical connection copper sheet and the second electrical connection copper sheet are respectively electrically connected to the first conductive copper ring and the second conductive copper ring through the conductive protrusions.

7. The rotatable plug according to claim 4, wherein the fixed seat is further provided with a first ring groove and a second ring groove, the first conductive copper ring is provided in the first ring groove, the first electrical connection copper sheet is inserted into the first ring groove, the second conductive copper ring is provided in the second ring groove, and the second electrical connection copper sheet is inserted into the second conductive copper ring.

8. The rotatable plug according to claim 4, wherein the third electrical connection copper sheet is further provided with an electrical connection protrusion, and the conductive copper sheet is further provided with a conductive protrusion plate that is configured to cooperate with the electrical connection protrusion for conduction.

* * * * *